Aug. 7, 1945.   F. A. WEBER ET AL   2,381,402
DROPPABLE FUEL TANK
Filed Oct. 20, 1944   2 Sheets-Sheet 1

INVENTORS
FRANK A. WEBER
AND
HARRY H. GREGG
BY
ATTORNEYS

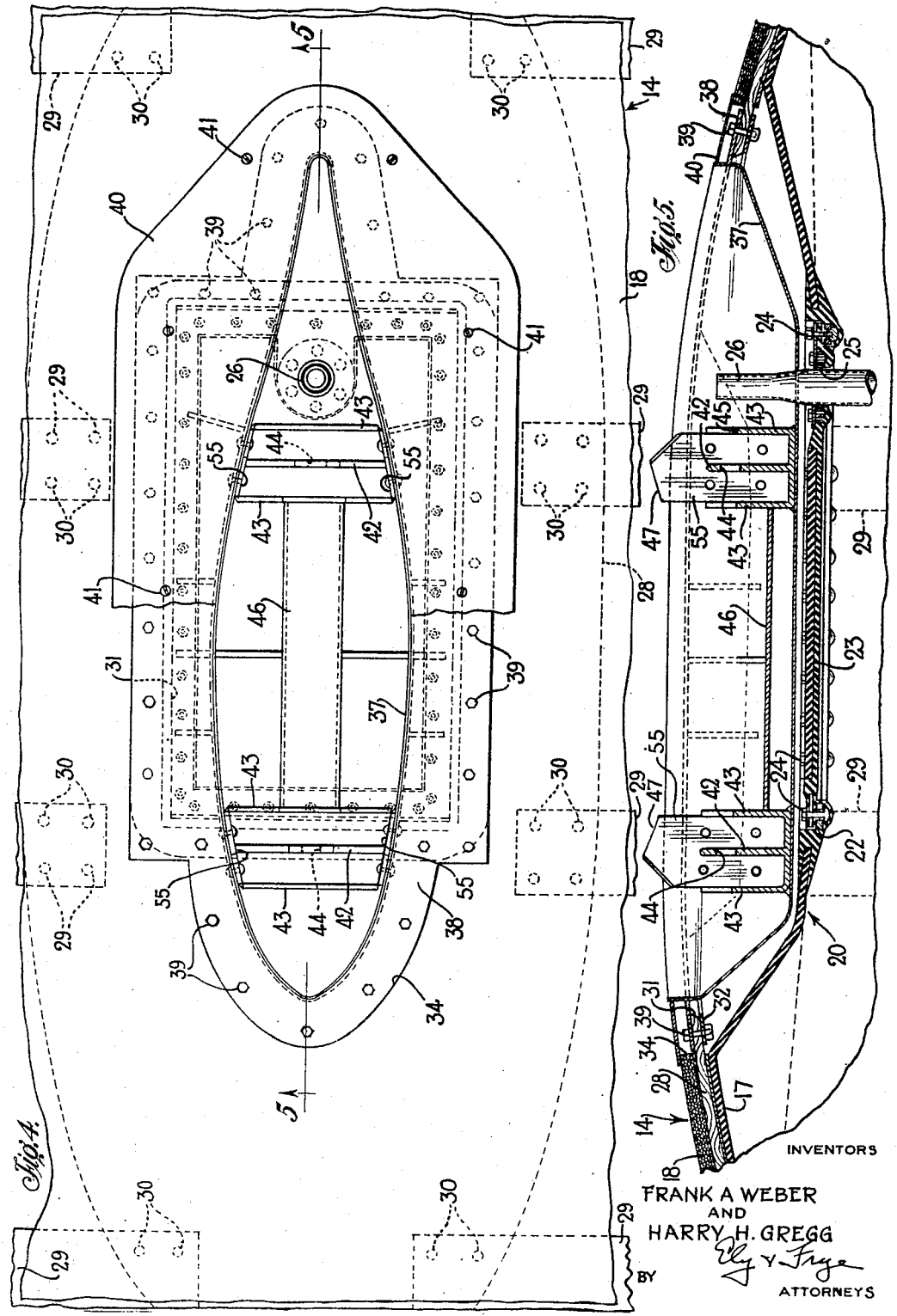

Patented Aug. 7, 1945

2,381,402

UNITED STATES PATENT OFFICE 2,381,402

DROPPABLE FUEL TANK

Frank A. Weber and Harry H. Gregg, Akron, Ohio, assignors to The Firestone Tire & Rubber Company, Akron, Ohio, a corporation of Ohio Application October 20, 1944, Serial No. 559,526

4 Claims. (Cl. 244—135)

This invention relates to droppable auxiliary fuel tanks such as are used on aircraft to increase the range of operation thereof and more especially it relates to cooperating mechanism on the aircraft and on the tank whereby the latter is releasably suspended from the aircraft.

The chief objects of the invention are to provide an improved suspending and quick-releasing structure for auxiliary fuel tanks of the character mentioned; to provide protection against gunfire for said suspending and quick-releasing structure; to provide in an improved manner for attaching the suspending structure to the fuel tank; and to provide means for preventing oscillation or swaying of the fuel tank while the aircraft is in flight. Other objects will be manifest as the description proceeds.

Of the accompanying drawings:

Fig. 4 is a detail plan view, on still a larger scale, of the central portion of the structure shown in Fig. 3; and Fig. 5 is a section on the line 5—5 of Fig. 4.

Figure 1:
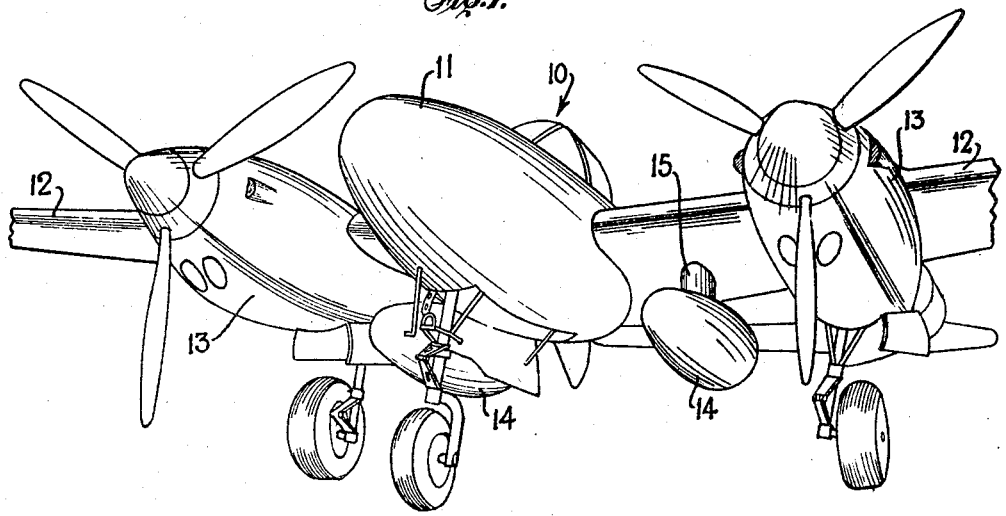
Fig. 1 is a fragmentary perspective view of an airplane equipped with droppable fuel tanks embodying the invention.

Referring first to Fig. 1 of the drawings, there is shown a light bomber airplane 10 of the twin engine type, which airplane comprises the usual hull or fuselage 11, wings 12, 12, and outboard engine-nacelles 13, 13 mounted on said wings.

Two of the improved fuel tanks, each designated as a whole by the numeral 14, are suspended from the bottom of the wings 12, between the fuselage 11 and the engine-nacelles 13. Each fuel tank is releasably suspended from a wing by means such as a bomb shackle, hereinafter more fully described, which bomb shackle is enclosed by fairing 15 which, among other things hereinafter set forth, serves to reduce wind resistance. For the same reason the fuel tanks 14 are of streamline shape with substantially uninterrupted surface.

The fuel tank 14 is of monocoque design, and comprises an internal bullet sealing lining or cell 17, and a rigid, external, non-metallic shell or casing 18. The lining 17 is composed of a plurality of plies of treated fabric and sealing composition, with an inner facing of material that is resistant to the action of hydrocarbon fuels. Since the composition of the lining is not a part of the present invention, a more detailed description thereof will not be given. At the top of the tank, in the medial region thereof, the lining 17 has a flattened region 20, Fig. 5, in which is located a manhole or access opening 21, the latter being rectangular in shape and having a metal reinforcing element 22 of similar shape built into its structure. The manhole 21 is closed by a cover 23 that is composed of composition similar to that employed in the remainder of the cell 17, and which has a reinforcing of metal in the margin thereof, said cover being secured in place by a plurality of cap screws 24 that extend through said cover and are threaded into the reinforcing 22 around the manhole. Adjacent its rear end the manhole cover 23 is formed with a marginally-reinforced aperture 25 through which extends a pipe 26 that is utilized in withdrawing fuel from the tank. The access opening 21 is large enough to enable a small man to enter the tank for any purpose that may arise.

Positioned at the top of the cell 17, and covering a substantial region thereof, including part of the flattened region 20, is a canopy 28 that is composed of plywood. Said canopy is of oval shape in plan, and is longitudinally and transversely arcuate in section so as to conform to the general contour of the tank. Circumscribing the cell 17 are a plurality of girth straps or hoops 29, 29, herein shown as four in number. The straps 29 are composed of plywood, and have skived ends that are secured to complementally skived portions on the margin of the canopy 28 by means of wood screws 30 and glue, as shown in Fig. 4. The canopy has a relatively large central opening 31 that is located over the flattened medial region 20 of the cell 17, the shape of said opening being somewhat irregular, as will be apparent from Figs. 4 and 5. The margin of the opening 31 is reinforced by a metal backing plate 32 attached to the under or concave side thereof, said backing plate formed with a longitudinal series of threaded apertures therethrough for a purpose presently to be explained.

The shell or casing 18 of the tank 14 is composed of plies of fabric impregnated and bonded to each other with a suitable heat-hardened plastic composition. Of the plastic compositions found suitable for the purpose may be mentioned one composed of urea-formaldehyde and Buna S synthetic rubber, and another one composed of phenolic resin and Buna S. When the first mentioned composition is used, the cell or lining 17 must be vulcanized before the shell or casing 18 is constructed thereon since said composition is injured by the higher temperature required to vulcanize the cell. When the second composition is used in the shell, both lining and shell may be vulcanized at the same time if desired. The vulcanized shell is dense and hard, and has substantial strength.

The shell or casing covers all of the cell 17 including the hoops 29, and all of the canopy 28 thereon except for an area adjacent the margin of the opening 31 therein, the margin of the shell about said opening being designated 34. Suitable bonding material is applied to the under side of the canopy and around the peripheral margins thereof to provide a union between the canopy and the shell and lining, and to prevent the entrance of steam therebetween when lining and shell are vulcanized at the same time.

Mounted within the opening 31 of the canopy is a deep metal pan 37 that has an integral marginal flange 38 that rests upon the exposed portion of the canopy within the shell-opening defined by the margin 34, said pan-flange being secured to the canopy by a plurality of cap screws 39, 39 that extend through the flange and canopy and are threaded into the metal backing plate 32 of the canopy. A thin metal cover plate or fairing 40 fitting closely around the pan 37 overlies the flange 38 and margin 34 of the shell opening, and conceals the cap screws 39. The fairing is secured in place by counter-sunk screws 41 that are threaded into the flange 38. Welded and/or riveted in the pan 37 at two spaced apart points are respective brackets that extend completely across the same, each bracket comprising a central web 42 and reinforcing webs 43, 43 at opposite sides thereof. Each of said central webs is formed with an aperture 44 therein, and the tops of the webs 43 are centrally notched at 45 substantially as deep as the bottom of said aperture. Between the said brackets the pan is reinforced by a longitudinally extending inverted channel 46 welded to the bottom of the pan. Said brackets have end walls 55 that extend upwardly above the top margin of the pan, the upper margin of each of said end walls being formed with two oblique surfaces meeting at a point, one of said oblique surfaces, designated 47, being provided for a purpose presently to be explained. The bottom of the pan is formed with a suitable aperture to enable the fuel pipe 26 to extend therethrough.

The fuel tank is suspended from an aircraft through the agency of bomb shackles that engage the webs 42 of the brackets in pan 37 and extend through the apertures 44 therein. The bomb shackles are of the conventional type used for releasably carrying bombs, and are indicated at 49, 49, Fig. 2. The fairing 15 that surrounds the bomb shackles 49 is of the same body contour as the pan 37, and is arranged to be received within the latter when the fuel tank is suspended from the bomb shackles. The bottom margin of the fairing 15 is shaped to conform to the contour of the bottom of the pan 37, and is notched at 50, 50 on each side thereof to span the webbed brackets within the pan. When the fuel tank is suspended from the bomb shackles, the end walls 55 of the said brackets are disposed exteriorly of the fairing 15, the oblique marginal surfaces 47 of said end walls engaging complimentally oblique faces 51, 51 formed on opposite ends of respective bearing strips 52 that are mounted on opposite sides of the fairing structure 15. The arrangement assures accurate registry of the fuel tank with its supporting structure, and provides stability by preventing side sway and longitudinal oscillation or tilting of the fuel tank.

Figure 2:
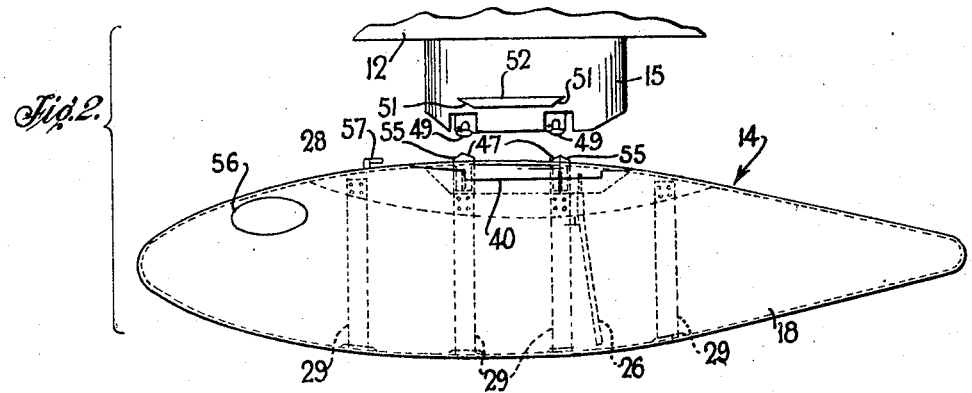
Fig. 2 is a side elevation, on a larger scale, of the improved fuel tank, and a portion of the quick-release structure to which it is attachable.
Figure 3:
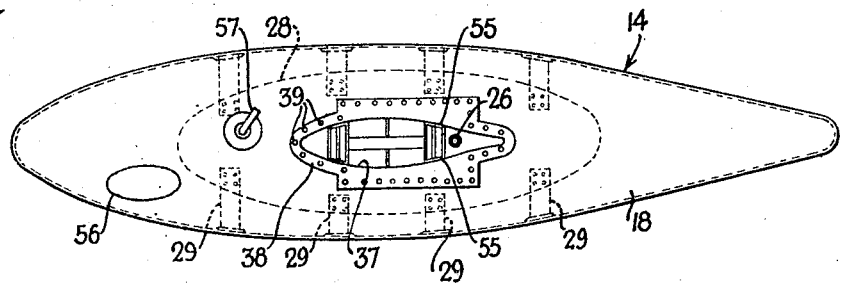
Fig. 3 is a plan view of the tank structure shown in Fig. 2.

In addition to the features previously set forth, the fuel tank is provided with a suitable filling opening located at 56, Figs. 1 and 2, it being understood that said opening has a covering that is flush with the surface of the shell 18. The tank also is provided with a vent opening at 57. Preferably some of the space between the canopy 28 and the flattened region 20 of the lining or cell 17, at each side of pan 37, is filled with suitably shaped blocks of wood (not shown); which may be of balsa because of its light weight.

The invention provides a fuel tank that will hold its shape in flight and under all conditions of loading, yet which employs but little metal in its construction. The entire load of the tank is carried by the stressed skin or shell 18 thereof, and the presence of the rigid plywood canopy 28, which extends about 30% of the area of the top of the tank, insures adequate distribution of the load. Furthermore, the arrangement for attaching the tank to an aircraft prevents swaying of the tank during flight. The location of the pan 37 within the tank and substantially below the canopy 28 protects the pan against gunfire such as might result in loosening or separating the fuel tank from the airplane. Also the presence of the webs 43 at opposite sides of the central webs 42, that are engaged by the shackles 49, additionally protect the webs 42 from gunfire.

Modification may be resorted to without departing from the spirit of the invention or the scope thereof as defined by the appended claims.

We claim:

1. A fuel tank of the character described comprising a fuel cell or lining of resilient composition having a flat region at the top thereof, a shell or casing of rigid non-metallic composition substantially enclosing the same, a plywood canopy interposed between the cell and casing, locally at the top of the tank and arched over the flat region of the cell, a portion of said canopy being exposed through an opening in the casing, there being an opening in the canopy above the flat region of the cell, and a metal structure received in the opening of said canopy and removably secured thereto in the marginal region about said opening, said metal structure comprising means for suspending the tank from a supporting structure.

2. A combination as defined in claim 1 including means projecting upwardly from the metal structure and engageable with the supporting structure to prevent lateral swaying movement of the tank relatively of the supporting structure.

3. A combination as defined in claim 1 wherein the metal structure is a pan that is disposed mainly below the canopy, its upper margin being substantially flush with the top of the casing.

4. In combination with an airplane, a quick-release supporting structure on the under side thereof, a fuel tank of skin-stressed monocoque design, said tank being of non-metallic composition and including a rigid ply-wood canopy built into its structure, means secured to said canopy for engagement with said quick-release supporting structure, fairing around the quick-release supporting structure, bearing strips mounted on opposite sides of said fairing, and means projecting upwardly from the tank structure adapted to engage with said bearing strips to register the tank accurately with the supporting structure and to prevent lateral, longitudinal and oscillatory movement of the tank relatively thereof.

FRANK A. WEBER.
HARRY H. GREGG.